Jan. 30, 1962  W. H. SCHOMERS  3,019,061

TRACK MECHANISM FOR VEHICLES

Filed March 20, 1958

INVENTOR.
WILLIAM H. SCHOMERS
BY
*B Messenger*

United States Patent Office 3,019,061
Patented Jan. 30, 1962

3,019,061
TRACK MECHANISM FOR VEHICLES
William H. Schomers, 1605 Wadsworth Ave.,
Lakewood, Colo.
Filed Mar. 20, 1958, Ser. No. 722,745
6 Claims. (Cl. 305—32)

The present invention relates to track-laying vehicles and, more specifically, to improvements in the design, construction and suspension of endless tracks suitable for use on track-laying vehicles adapted for use in snow and in mountainous and rugged terrain.

Previously, various types of track-laying vehicles have been designed and built, and several patents have previously been directed to the actual design and mounting of the track itself.

The primary object of the present invention is to provide an improved type of track and mounting therefor which is especially adapted for use on vehicles that are to be used over rough and rugged terrain and also over snow-covered slopes.

In satisfaction of the primary objective of this invention, it is likewise an object of this invention to provide novel construction for a vehicle track as well as novel means for the driving, suspension, support and articulation of said track and track mechanism.

Specific objects of this invention include the provision of a track especially adapted for use in snow to give improved flotation and traction as well as to provide increased sidehill support for said track and the vehicle supported thereby.

Another object of this invention is to provide means for readily mounting a track of the desired type and for correctly tensioning the same on the track supporting idler and drive wheels.

A further object of this invention is to provide means for articulating an intermediate drive wheel, bogey or idler independently of the other drive wheels, idlers and bogeys, so that a vehicle supported by the track system will be more easily able to move over obstacles that are shorter than the length of the track as a whole.

Figure 1:
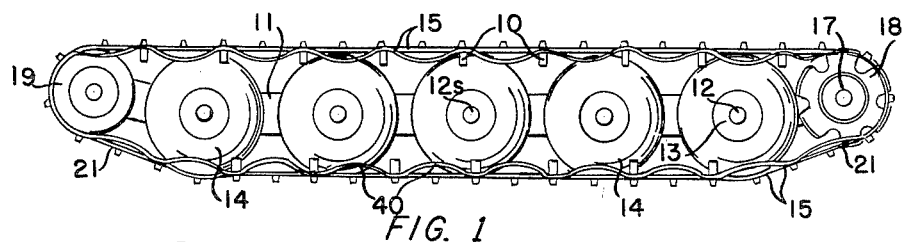
Figure 2:
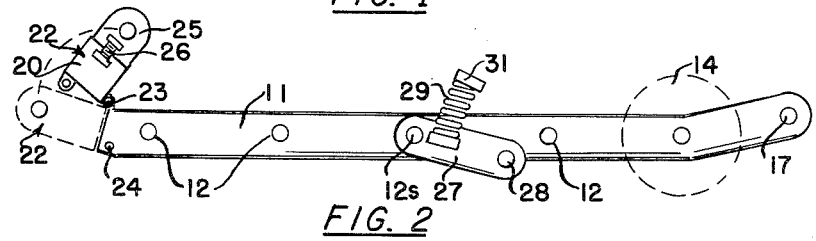
Figure 5:
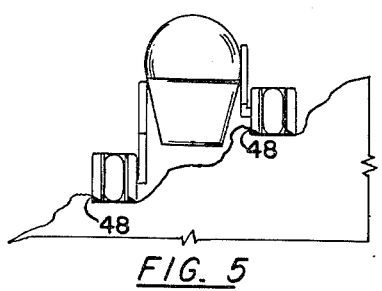
Figure 3:
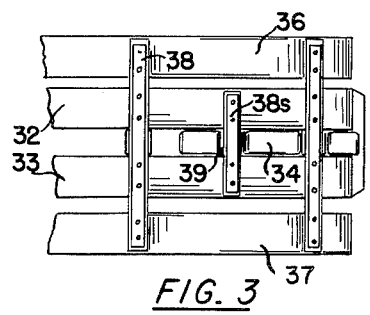
Figure 6:
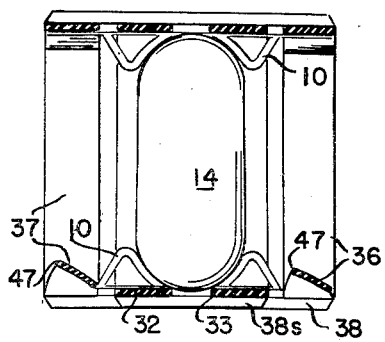
Figures 4, 8:
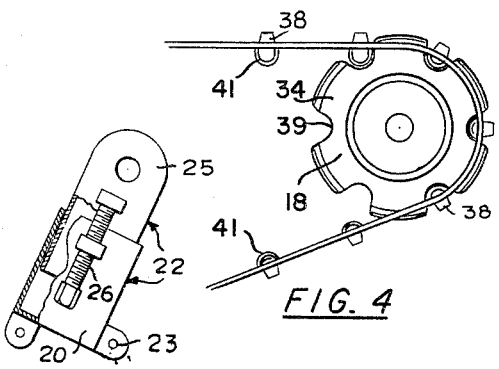
Figure 7:
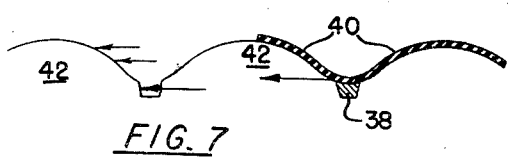

Further objects and advantages of the present invention will be apparent from the appended description and drawings, in which FIG. 1 is a side elevation showing a track and track suspension system made in accordance with this invention, FIG. 2 is a side elevation showing the frame support, tensioning and wheel articulation mechanisms of the present invention, FIG. 3 is an enlarged top view showing assembled features of the track and track drive member, FIG. 4 is a side elevation showing further details of the mechanism illustrated in FIG. 3, FIG. 5 is a side view showing features of a track made in accordance with this invention as adapted to use on a track-laying vehicle especially adapted for sidehill operation, FIG. 6 is an enlarged cross-sectional elevation in partial section taken transversely to the track showing additional features of this invention as well as showing in enlarged detail the sidehill features of a track made in accordance with this invention, FIG. 7 is an enlarged detail illustration showing the track pattern for a track made in accordance with this invention when used in snow, and FIG. 8 is an enlarged side view in partial cut-away section showing features of a lever extension assembly.

Briefly stated, the present invention provides a design and construction for the track and track support mechanism of a track-laying vehicle intended for use over rough terrain under dry, muddy and snow-covered conditions. To obtain the desired flotation characteristics and to keep the weight of the track unit down, this invention provides a track assembly having a light weight tubular type longitudinal frame upon which a plurality of stub axles are mounted and adapted to receive balloon type tires. The track itself is made up of a plurality of fabric reinforced rubber belts joined each to each in side-by-side relation by track lugs on the exterior surface of the belt and by track suspension members on the interior face of the belt adapted for engagement with the intermediate balloon tire bogey wheels. Since the track is made up of stretchable rubber belting material, an overcenter device is provided for initial installation and tensioning of the track, and a telescoping device is likewise provided so that tension adjustments may be made as desired. At least one intermediate bogey wheel is pivotally mounted for reciprocal articulation separate from the other bogeys, idlers and drive wheels in order to facilitate movement over relatively high or short obstacles. In order to provide increased traction and to improve the sidehill operating characteristics of the track mechanism, the outermost track belts are not tensioned between the lugs and about the support wheels but are relatively loose between their respective track lugs. This flexible outer belt greatly improves the traction characteristics of the track in mud and snow and likewise improves the sidehill operating characteristics of the device.

Specific features of the present invention will be more readily understood with reference to the accompanying drawings, in FIG. 1 of which the overall assembled relation of a track device made in accordance with this invention is shown. In this figure and in FIG. 2 it will be noted that the track mechanism is basically supported by a longitudinal frame member 11, which is preferably of light tubular construction. Intermediate the ends of this frame member a plurality of stub axles 12 are mounted and adapted to receive the hubs 13 of intermediate bogey wheels 14. All of these intermediate wheels 14 are mounted for free rotation on their respective stub axles, and preferably these wheels are of balloon type pneumatic structure to provide a wide area of contact with support lugs 10 of the track unit 15 as well as to provide a considerable amount of flotation if the vehicle is to be used in water.

At one end of the frame 11 and on a driven axle 17, a drive pulley 18 is provided, while on the opposite end an idler 19 is provided in elevated position with respect to the intermediate bogey wheels 14, so that the track when disposed over the drive pulley 18, idler 19 and intermediate wheels 14 will have upturned end sections 21, which increases the ability of the vehicle to move up and over encountered obstacles.

Since the track 15 which is disposed about all of the wheels 14, 18 and 19 is preferably made of a fabric reinforced rubber belting, it is necessary to provide means for installing the belt track 15 and also for adjusting the tensioning thereof. These functions are served by an overcenter lever extension assembly 22 pivotally secured to the frame 11 by the pivot pin 23. When in the raised alternate position, as shown in FIG. 2, the belt track 15 may be easily moved into position about the wheels of the track assembly. As the overcenter lever extension assembly 22 is moved to its operating position, as shown in FIG. 1, the belt track 15 will be tensioned and the lever extension assembly 22 will move into an overcenter position where it will be maintained by the belt tension and likewise by a locking pin 24. It is contemplated that in use of the track mechanism over a long period of time the tension of the belt track will have to be adjusted, and accordingly, as shown in FIGS. 2 and 8, the lever extension assembly 22 is actually a telescoping type structure having a socket piece 20 and an extension end 25 which may be adjustably lengthened or shortened by the adjusting screws 26 to effect the needed changes in belt track tension.

Since the track assembly is relatively long, it has been found desirable to separately articulate at least one of the intermediate bogey wheels 14 in order to prevent severe pitching of the vehicle when the vehicle is moved up and over relatively high but short obstacles. In order to prevent the natural tendency of a vehicle with a unitary track to balance on top of any obstacle and to teeter about its center of gravity before nosing itself sharply into the ground on the opposite side of the obstacle, mechanism has been provided to allow one of the intermediate wheels 14 to move up and down independently of the other wheels.

One type of mechanism found suitable for this purpose is shown in FIG. 2, in which it is shown that the stub axle 12s is mounted on an actuator arm 27 which is itself pivoted about a pin 28 secured to the frame 11. With this arrangement the stub axle 12s and the intermediate wheel mounted thereon is allowed to move arcuately or reciprocally upwardly and downwardly as opposed by the force extrted by the spring unit 29 mounted intermediate the actuator arm 27 and spring receptacle 31 which is secured to frame 11. By permitting one of the intermediate wheels to move reciprocally upwardly with respect to the positioning of the other wheels, it has been found that heavy pitching movements of the track and vehicle are minimized or eliminated when the track encounters obstacles having steeply raising sides.

Further details of the construction of the track itself are best described with reference to the remaining FIGS. 3 through 7. In FIG. 3 it should be noted that the track is made up of a plurality of endless belt strips arranged in side-by-side relation, so that the innermost belt drive members 32 and 33 are spaced apart a distance corresponding to the thickness of the drive wheel cogs 34. Likewise, the outer belt traction members 36 and 37 are spaced away from the inner drive belts 32 and 33 respectively, so that the clearance between the belts will prevent the building up of mud or snow clods and will by independent flexing facilitate the breaking up and removal of such clods of snow. Further, it should be noted that the innermost belts 32 and 33 are secured by fastening means, such as bolts, screws or rivets to all of the traction lugs 38 irrespective of whether these lugs are short, as in 38s, or long, as in 38. The belt traction members 36 and 37 are secured to the outwardly extending portions of the long lugs or cleats by separate fastening means. Whether long or short the lugs 38 are cooperatively spaced one with the other so as to mate with the drive notches 39 of the drive wheel 18. Accordingly, the drive power transmitted by the drive wheel 18 is exerted against the lugs 38 and is by the lugs transmitted to the track belts. Actually the inner surface of the lugs 38 is provided with a curved surface 41 which cooperatively mates with the curved surface of the notches 39 so that the drive force exerted against the lugs 38 is applied against such curved surface 41 along a line of contact substantially corresponding with the plane of the track drive belts themselves. Accordingly, any tendency of the belts to be twisted or cocked by the lugs is minimized.

In order to obtain improved traction and sidehill operating characteristics for the track device shown, it has been found desirable to only tension the innermost belt drive members 32—33 of the track assembly, whereas the outer belt traction members (here shown as 36 and 37) are allowed to be relatively loose and are only connected to the longer spaced track lugs 38. With the loose connection of the outermost belts, considerable flexure of these belts is noted and is in fact desirable. This independent flexuring of the outermost belts is useful, since it provides undulations 40 in the belt thereby increasing traction for the track mechanism when the track is operating in mud or snow conditions. As shown in FIG. 7, the track then has a traction pattern which allows humps 42 of snow or mud to be built up in between the lugs 38. These humps 42 of semi-compressed snow or mud necessarily resist any shearing or scraping movement of the outer ends of lugs 38 and necessarily will increase the traction characteristics of the track mechanism. This feature has been found to be of great utility when the vehicle is being used in powdery snow or in mud conditions.

One further advantage of the use of untensioned or loose track belts has been noted in connection with use of this type track on vehicles which are particularly adapted for use on sidehill slopes of the type described in my co-pending application, Serial No. 643,771, filed March 4, 1957, now Patent No. 2,967,578. When used on sidehills or on steeply sloping surfaces in snow conditions, the loose outer belt traction members 36 and 37 again tend to gather or mound up small humps of snow on the sloping sidehill, so that the downhill edge 47 of the belts 36 and 37 is raised and exerts a pressure against the mounded humps of snow 48. With this pattern of resistance, the tendency of the track belt to tilt about the track supporting wheels 14 or idler 19 is minimized, and the natural tendency of the track to slide sideways and down the hill is resisted. Accordingly, better sidehill performance is possible. The support lugs 10 which are fastened to the belts on the underneath side of the lugs 38 are preferably of a form as shown in FIG. 6, so that they will closely engage the balloon wheels 14 and the idler 19. This close engagement further resists the tendency of the belt to tilt due to uneven loading on the inside or outside of the tracks.

As further features of the track device shown, it should be noted that the drive wheel 18 is preferably of a rubber covered type construction to minimize wear on the curved surfaces 41 of the lugs 38 and to reduce noise. The narrow type drive wheel 18 has been found preferable, since no snow and ice will build up on the narrow notches.

In general, the features of the present invention are of utility in other types of track laying vehicles other than those using a system comparable to that shown. These features give added traction or otherwise provide the advantages discussed irrespective of the direction and motion of the traction unit. It has been found that the drive wheels and idlers may in certain installations all be placed in position of contact with the ground, though the out-of-contact position is preferred. Further, it has been found that the traction has special advantage in installations in which the drive wheel is located in front of the unit rather than in the rear although comparative tests show that either arrangement may be used to advantage.

Further advantages and modifications of the present invention will be apparent to those skilled in the art. All such modifications and changes as come within the scope of the hereunto appended claims are deemed to be a part of this invention.

What is claimed is:

1. A track type suspension unit for vehicles comprising a longitudinal frame member, a plurality of wheel units mounted thereon for rotation, an extension member on said frame, at least one wheel member on said extension, pivot means on said extension member for alternately moving said extension member to a position of operative use in locked engagement with said frame and a further position of non-use away from locked engagement with said frame, a longitudinally resilient endless belt type track member adapted for tensioned engagement about said wheels for vehicle propelling movement therealong, said pivot means being positioned in off center relation with respect to said frame, extension member and the wheels on said frame and extension whereby tension forces in said belt will hold said extension in operating position.

2. A track type suspension unit for vehicles comprising a longitudinal frame member, a plurality of wheel units mounted thereon for rotation, an extension member on said frame, at least one wheel member on said extension, pivot means on said extension member for alternately moving said extension member to a position of operative use in locked engagement with said frame and a further position of non-use away from locked engagement with said frame, a longitudinally resilient endless belt type track member adapted for tensioned engagement about said wheels for vehicle propelling movement therealong, said pivot means being positioned in off center relation with respect to said frame, extension member and wheels on said frame and extension whereby tension forces in said belt hold said extension in operating position, and means for adjusting the tension in said belt track by adjusting the relative distances between said frame and extension wheels.

3. In an endless track for track laying vehicles utilizing track driving and supporting wheels, a pair of endless drive members adapted to transmit the drive and support force of said vehicle wheels, a pair of belt traction members of resilient material positioned adjacent and laterally outwardly from said endless drive members for movement therewith, cleats arranged transversely to said endless drive and belt traction members for holding said members in fixed relative positions while permitting free and independent flexure of said belt traction members intermediate said cleats, said belt traction members providing a longitudinally corrugated pattern as viewed from the side and top when the endless track and vehicle is being moved over loose and lightly compacted terrain whereby the traction and side slip resistance of said endless track is materially increased.

4. In an endless track for track laying vehicles utilizing track driving and supporting wheels, a plurality of endless drive members adapted to transmit the drive and support force of said vehicle wheels, a plurality of belt traction members of resilient material positioned adjacent said endless drive members for movement therewith, cleats arranged transversely to said endless drive and belt traction members for holding said members in fixed relative positions with the endless drive members being tensioned between vehicle drive and support wheels, and segments of the belt traction members being loosely disposed between the attaching cleats for permitting free and independent flexure of said belt traction member segments between said attaching cleats, said belt traction members providing a longitudinally corrugated pattern as viewed from the side and top when the endless track and vehicle is being moved over loose and lightly compacted terrain whereby the traction and side slip resistance of said endless track is materially increased.

5. In an endless track unit for track laying vehicles utilizing track driving and supporting wheels, an endless drive member tensioned over said vehicle wheels and adapted to transmit the propelling drive and support force of said vehicle wheels, belt traction members of resilient material positioned laterally outwardly from said endless drive member for movement therewith, cleats positioned along said endless drive member for attaching said belt traction members to said endless drive member with the resilient belt traction members being loosely disposed between points of attachment, whereby each of said belt traction members as viewed from the side and top provide a longitudinally corrugated traction pattern on each side of said centrally disposed endless drive member when the vehicle and track is being moved over loose and lightly compacted terrain to increase the traction and side slip resistance of said unit.

6. In an endless track for track laying vehicles utilizing track driving and supporting wheels, an endless drive member disposed about said wheels in tensioned arrangement and adapted to transmit the drive and support force of said wheels, a plurality of drive cleats disposed transversely to said endless drive member, portions of alternate drive cleats extending laterally outwardly past the said endless drive member, a plurality of belt traction members positioned outwardly from said endless drive member, fastening means interconnecting said drive cleats and endless drive member, and separate fastening means interconnecting said belt traction members to the lateral extending portions of said alternate drive cleats in a manner providing loosely disposed segments of said belt traction members between said alternate drive cleats for permitting free and independent flexure of said belt traction member segments, said belt traction member segments providing a longitudinally corrugated pattern as viewed from the side and top when the endless track and vehicle is being moved over loose and lightly compacted terrain whereby the traction and side slip resistance of said endless track is materially increased.

References Cited in the file of this patent

UNITED STATES PATENTS

| | | |
|---|---|---|
| 1,393,157 | Olliver | Oct. 11, 1921 |
| 2,242,570 | Dafoe | May 20, 1941 |
| 2,323,526 | Eliason | July 6, 1943 |
| 2,779,636 | Allen | Jan. 29, 1957 |
| 2,786,725 | Thorne | Mar. 26, 1957 |
| 2,796,303 | Atkinson | June 18, 1957 |

FOREIGN PATENTS

| | | |
|---|---|---|
| 22,828 | France | Mar. 10, 1921 |
| | (2nd addition to No. 521,750) | |
| 40,225 | Denmark | May 21, 1929 |
| 478,066 | Canada | Oct. 30, 1951 |